United States Patent [19]

Bergum et al.

[11] 4,215,189

[45] Jul. 29, 1980

[54] ELECTROCHEMICAL BATTERY EMPLOYING A LATEX BONDED LEAD DIOXIDE ELECTRODE

[75] Inventors: Bernard C. Bergum; Alf M. Bredland; John W. Paulson, all of Madison, Wis.

[73] Assignee: ESB Inc., Philadelphia, Pa.

[21] Appl. No.: 44,148

[22] Filed: May 31, 1979

[51] Int. Cl.$^2$ .............................................. H01M 4/56
[52] U.S. Cl. .................................... 429/217; 429/228
[58] Field of Search ................................ 429/217, 228

[56] References Cited

U.S. PATENT DOCUMENTS

| | | | |
|---|---|---|---|
| 2,177,062 | 10/1939 | Gibbons et al. | 429/217 |
| 2,727,080 | 12/1955 | Moulton | 429/217 |
| 2,738,375 | 3/1956 | Schlotter | 429/217 |
| 3,113,050 | 12/1963 | Kordesch et al. | 429/217 |
| 3,400,020 | 9/1968 | Carpino et al. | 429/217 |
| 3,496,020 | 2/1970 | Jackson et al. | 429/217 |
| 3,770,507 | 11/1973 | Weissman et al. | 429/228 X |
| 4,160,747 | 7/1979 | Schneider et al. | 429/217 X |

*Primary Examiner*—Charles F. LeFevour
*Attorney, Agent, or Firm*—E. C. MacQueen; G. W. Rudman

[57] ABSTRACT

A lead dioxide electrode structure for an electrochemical battery is formed using a mixture of lead dioxide particles, carbon black particles, and a latex. The materials are mixed to form a compact and homogeneous electrode mixture. The mixture is then coated upon a conductive layer which is binded to a shim. This structure is useful as a cathode in an electrochemical primary battery of the reserve type.

7 Claims, No Drawings

ELECTROCHEMICAL BATTERY EMPLOYING A LATEX BONDED LEAD DIOXIDE ELECTRODE

BACKGROUND OF THE INVENTION

1. Field of the Invention

This invention relates to a primary battery of the reserve type and more particularly, to a primary battery employing a latex bonded lead dioxide electrode.

2. Prior Art

Reserve batteries which utilize a lead dioxide electrode are known. Various means for bonding lead dioxide are also known. U.S. Pat. 3,318,794 discloses bonding lead dioxide with resinous material. U.S. Pat. 3,770,507 discloses bonding lead dioxide with a plastic and a synthetic fibrous material. An article published by T. J. Kilduff and E. F. Horsey in the "24th Annual Proceedings Power Source Symposium, May 19-20-21, 1979", discloses the use of bonding lead dioxide with either an epoxy and polyamide resin in an organic solvent or a water emulsified epoxy resin and water emulsifiable polyamide resin. Usually, these bonded lead dioxide electrodes are bonded to a conductive layer which is itself bonded to a shim. Unfortunately, however, quite frequently the lead dioxide electrodes known in the Prior Art do not have sufficient adhesion to the conductive layer to prevent flaking from the conductive layer or to prevent corrosion of the shim.

Currently, the military is utilizing an electroplating technique to plate unbonded lead dioxide onto a conductive layer. This limits the flaking and corrosion. However, this process is somewhat inflexible in production rate because of the limitations required in the electrochemical lead dioxide deposition rate to prevent causing undesirable side effects.

What would be desirable is a lead dioxide material that would have excellent adhesion to the conductive layer and which would be capable of making a cathode which would be able to undergo high production rates in compact production equipment, have high flexibility in capacity design size of cell, have high ampere hour efficiency of at least approximately 30% of high current density of 240 ma/in$^2$ and be able to use lower cost lead dioxide, e.g., chemically precipitated type.

SUMMARY OF THE INVENTION

The foregoing objects are accomplished and the shortcomings of the Prior Art are overcome by the present electrochemical battery electrode which is comprised of lead dioxide mixed with carbon and latex which has been applied to a conductive layer coated shim.

DETAILED DESCRIPTION OF THE INVENTION

Lead dioxide is well known in the battery art. It has been found that any commmercially available lead dioxide can be utilized in the current invention. The lead dioxide can be either electroformed, electroplated, or chemically precipitated and be either alpha or beta lead dioxide. It is only necessary that the particle size be less than 200 microns. When commercially available lead dioxide from various sources was analyzed, it was found to be 77–97.5% PbO$_2$ (most frequently about 95% PbO$_2$), have 0–50% alpha lead dioxide (most frequently about about 5% alpha-lead dioxide), and have a particle size of less than 15 microns.

Carbon black, well known in the art, is utilized in the mixture to provide conductivity. Graphite and acetylene black are the carbon blacks most common in the battery art. Commonly sold blacks are sold under the trademarks Calbot XC-72R and Shawingan black. The ratio of carbon black to lead dioxide can range from 1 part carbon to 5–50 parts PbO$_2$ by weight. Preferred is a ratio of 1 part carbon to 12–25 parts PbO$_2$. Peak performance was at 1 part carbon/18 parts PbO$_2$.

Latexes are colloidal dispersions in which, upon drying, the particles coalesce to form a network binding the particle electrode mass together. This latex network cures by reacting with oxygen from the air irreversibly to form an insoluble inert binder network. Preferably, the latex will be a butyl rubber latex. Usually, commercially available latexes contain 50–70% by weight total solids.

Butyl latexes which have been utilized and provided excellent results include two sold under the marks BP-100 and EMD 604. BP-100 is sold by the Burke-Palmerson Co. It is a copolymer of isobutylene-butadiene which has the following characteristics:
Total Solids, Weight %: 61–65
pH (by glass electrode): 4.5–6.5
Viscosity, Brookfield RVT#3 Spindle @ 10 RPM, cps, 25° C.: 2000–5000
Specific Gravity: 0.95
Density, lbs./gallons: 8.0
Surface Tension 70° F., Dynes/cm: 38

EMD 604 is a high strength butyl rubber latex sold by the Exxon Chemical Company. It has the following characteristics:
Total Solids, Weight %: 54
pH: 5.4
Viscosity, Brookfield, cps LVT #3 Spindle @ 12 RPM: 300
Specific Gravity
Wet: 0.90
Dry: 0.92
Particle Size, micron (AVG): 1

The amount of latex added to the lead dioxide-carbon mixture is based on the amount of solids present in the latex. The amount of latex should be about 2–10% by weight of the total PbO$_2$-carbon black-latex mixture. Preferably the range will be 2–7%; more preferably, the range will be 3–4%.

The lead dioxide, carbon black and latex mixture can also contain additives. These additives usually are surfactants which provide better wetting of the lead dioxide and carbon black. The amount of additives is based on the amount of carbon black. An optimum level has been found to be about 0.1–0.3 parts additive per 1 part carbon black. However, more or less can be added. Surfactants which have been used include tetra-sodium pyrophosphate, fluorosurfactants and Lomar-D (which is a high molecular weight sulfonated napthalene condensate [napthalene sulfonate] sold by Diamond Shamrock Chemical). The additives are usually dissolved in water prior to mixing with the lead dioxide/carbon mixture.

As the above shows, the composition of the mixture, based on the total solids, and percentages by weight, is
Lead Dioxide: 75–96%
Carbon Black: 2–15%
Latex: 2–10%
Additive: 0–2%
Preferably, the composition is
Lead Dioxide: 87–93%

Carbon Black: 3.5–7%
Latex: 3–4%
Additive: 0.5–2%

The latex-bonded lead dioxide material is meant to be used in conjunction with a shim coated with a conductive layer.

The conductive layer can be made of any suitable material. The preferred are thermoplastic resins filled with carbon to make them conductive. The presently preferred material for this purpose is a carbon filled vinyl sold under the trademark Condulon by Pervel Industries, Inc.

The shim may be of any material adequate to act as a current collector. For example, it can be tin, steel, aluminum, or the like in a film or sheet form to which has been prelaminated or coated in a conventional manner a conductive coating.

The lead dioxide is applied to the conductive layer side of the shim. The lead dioxide can be applied by any conventional method. These methods include silk screening, stenciling, transfer printing or continuous coating.

The viscosity of the uncured lead dioxide mixture must be within a range to permit application of the mixture to the coated shim. It has been qualitativeley judged that if the mixture is thixotropic the viscosity will be 5,000–50,000 centipoise as measured by Brookfield RVT #3 spindle at 20 RPM and the 1 RPM.

The application of the lead/dioxide carbon black/latex mixture may be to about a thickness of 0.025–0.5 mm as required. It is then dried, for example, under controlled forced air conditions. The electrodes may then be punched or cut to the desired shape or utilized directly as printed in any discrete size. Electrode webs may also be rolled up, stored and fed into a cell assembly operation at a later time.

Of course, the bonded lead dioxide cathode must be used in conjunction with other battery components to form a reserve battery. These components are well known in the art. They include anode, separator material, and electrolyte. The Applicants have utilized a lead foil as an anode, Kraft paper as a separator material, and fluoroboric acid as the electrolyte. The use of other materials well known in the art are within the inventive concept.

EXAMPLE 1

A bonded lead dioxide mixture having the following components were prepared.

| Component | Weight % |
|---|---|
| Tetra-Sodium Pyrophosphate (TSPP) | 0.72 |
| Lomar-D | 0.29 |
| PbO$_2$ | 90.47 |
| Shawingan Black | 5.02 |
| Butyl Latex (BP-100) | 3.50 |
| Weight % Based On Solids Only | 100.00% |

The TSPP and Lomar-D was dissolved in a small amount of water. The PbO$_2$ and Shawingan Black were pre-blended to disperse the black throughout the PbO$_2$. If the black is not dispersed adequately it sometimes would absorb water from the latex and coagulate, making an unusable product. The PbO$_2$/black blend is added with stirring to the solution. Lastly, the butyl latex is added to the PbO$_2$ mixture with stirring.

This mixture was printed by silk-screening onto Condulon coated steel the electrode.

The facial area of the electrode was 37 sq.cm. A printed electrode thickness of 0.08–0.13 mm was employed. A high purity lead foil, 0.038 mm thick, was employed as the anode. This cell was activated by metering 2 ml of 48% fluoroboric acid (HBF4) solution into the cathode and Kraft paper separator and then placing the anode foil. The initial open circuit voltage was observed for stability. The cell was discharged through 1.1 ohms. This resulted in a cell having an average current density of about 37 ma/sq.cm. to a 1.40 volt endpoint and 35 ma/sq.cm. to a 1.00 volt endpoint. Coulombic efficiencies of the cell ranged from about 20–40% depending upon the type of lead dioxide utilized, endpoint voltage and storage conditions.

This experiment showed that cathodes using latex bonded lead dioxide had good shelf life characteristics under various temperature storage conditions. Adhesion of the bonded lead dioxide to the substrate was very good and appeared unaffected by extended storage time and temperatures at 146° F. for up to nine months at 146° F. This process for preparing latex bonded lead dioxide electrodes was capable of high production rates in modest size equipment.

We claim:

1. An improvement in an electrochemical primary battery of the reserve type comprising
   an anode,
   an electrolyte,
   a separator,
   and a cathode, containing a lead dioxide material wherein the improvement is the material being comprised of a mixture of lead dioxide, carbon black, and butyl rubber latex.

2. The improvement of claim 1 wherein the material additionally comprises stabilizers, wetting agents, thickeners, and surfactant.

3. The improvement of claim 1 wherein the material is coated upon a conductive layer coated upon a shim.

4. The improvement of claim 1 wherein the material is comprised of, on a weight percentage basis of total solids,
   Lead Dioxide: 75–96%
   Carbon Black: 2–15%
   Butyl Latex: 2–10%
   Additives: 0–2%

5. The improvement of claim 1 wherein the material is comprised of, on a weight percentage basis of total solids,
   Lead Dioxide: 87–93%
   Carbon Black: 3.5–7%
   Butyl Latex: 3–4%
   Additive: 0.5–2%

6. The improvement of claim 1 wherein the butyl latex is a copolymer of isobutylene-butadiene.

7. A reserve battery comprising
   a lead anode,
   a fluoroboric acid electrolyte,
   a separator and
   a cathode comprising a steel shim coated with a plastic filled with carbon; the coated shim coated with a mixture of lead dioxide, carbon black and butyl rubber latex wherein the mixture has been cured.

* * * * *